(12) United States Patent
Mohajeri et al.

(10) Patent No.: US 12,027,925 B2
(45) Date of Patent: Jul. 2, 2024

(54) METHOD OF ASSEMBLING A HIGH-TEMPERATURE ELECTROMAGNETIC MACHINE

(71) Applicant: HONEYWELL INTERNATIONAL INC., Charlotte, NC (US)

(72) Inventors: Mahdi Mohajeri, Morris Plains, NJ (US); Eric Passman, Morris Plains, NJ (US); Bahram Jadidian, Morris Plains, NJ (US); James Piascik, Morris Plains, NJ (US); Robert Dietrich, Torrance, CA (US); Andre Robinson, Tempe, AZ (US); Jimmy Wiggins, Tempe, AZ (US); Tom McHugh, Sandyston, NJ (US); Yongbae Jung, Torrance, CA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/823,167

(22) Filed: Aug. 30, 2022

(65) Prior Publication Data

US 2024/0072621 A1    Feb. 29, 2024

(51) Int. Cl.
*H02K 15/06* (2006.01)
*H02K 15/02* (2006.01)
(Continued)

(52) U.S. Cl.
CPC ......... *H02K 15/067* (2013.01); *H02K 15/026* (2013.01); *H02K 15/105* (2013.01); *H02K 15/12* (2013.01); *Y10T 29/49009* (2015.01)

(58) Field of Classification Search
CPC ........... Y10T 29/4902; Y10T 29/49071; Y10T 29/49009; Y10T 428/2958; H02K 3/02;
(Continued)

(56) References Cited

U.S. PATENT DOCUMENTS 5,636,434 A    6/1997  Okey et al.
8,572,838 B2 *  11/2013 Piascik ................. H01F 41/12
                                        336/200
(Continued)

FOREIGN PATENT DOCUMENTS

CN    109038901 A    12/2018
CN    108039784 B    2/2020
(Continued)

*Primary Examiner* — Thiem D Phan
(74) *Attorney, Agent, or Firm* — Lorenz & Kopf LLP

(57) ABSTRACT

A method of making an electromagnetic coil for use in a high-temperature electromagnetic machine includes pre-coating magnet wire with a high-temperature insulation precursor to produce pre-coated magnet wire, winding, while applying in-situ a glass-ceramic slurry, the pre-coated magnet wire into a predetermined coil shape to produce a wet-wound green coil, and thermally processing the wet-wound green coil to produce a processed coil. In some instances, a second layer of a high-temperature insulation may be applied to the processed coil to produce a further insulated processed coil, and then thermally processing the further insulated processed coil to produce a further processed electromagnetic coil.

8 Claims, 7 Drawing Sheets

(51) Int. Cl.
*H02K 15/10* (2006.01)
*H02K 15/12* (2006.01)

(58) Field of Classification Search
CPC ....... H02K 15/067; H01F 41/04; H01F 41/06; H01F 5/00
USPC ............................... 29/596, 598, 602.1, 605
See application file for complete search history.

(56) References Cited

U.S. PATENT DOCUMENTS

| | | |
|---|---|---|
| 10,366,809 B2 | 7/2019 | Fukuda et al. |
| 2006/0119197 A1 | 6/2006 | Puterbaugh et al. |
| 2012/0319521 A1 | 12/2012 | Kimura et al. |
| 2016/0380494 A1 | 12/2016 | Kim |
| 2017/0011820 A1 | 1/2017 | Yin et al. |
| 2018/0114631 A1 | 4/2018 | Ida et al. |

FOREIGN PATENT DOCUMENTS

| | | |
|---|---|---|
| CN | 111711287 B | 2/2022 |
| EP | 0566303 A1 | 10/1993 |
| FR | 1239588 A | 8/1960 |
| JP | S56167303 A | 12/1981 |
| JP | H10146028 A | 5/1998 |
| JP | 2005278353 A | 10/2005 |
| JP | 2006157991 A | 6/2006 |
| JP | 2006253272 A | 9/2006 |
| WO | 2021191563 A1 | 9/2021 |
| WO | 2021217888 A1 | 11/2021 |

\* cited by examiner

METHOD OF ASSEMBLING A HIGH-TEMPERATURE ELECTROMAGNETIC MACHINE

TECHNICAL FIELD

The present invention generally relates to electromagnetic machines, such as motors, and more particularly relates to a high-temperature electromagnetic machine and a method of manufacturing the same.

BACKGROUND

Electric motors are used in a myriad of systems and environments. They can generate relatively large amounts of heat during powered operation. More specifically, during motor operation, current flow through the electromagnetic coils causes heat to be generated due, in part, to the resistance of the coils. This heat causes the coil and device temperatures to rise. As the coil temperature increases, the generated heat is typically transferred from the coils toward area(s) with lower temperatures. The temperature that the coil can handle depends mainly on the temperature limits of the electrical insulation used on the conductors. The higher the temperature the coils and motor assembly can handle, the higher the power density of the motor.

The operational temperature of most conventional electromagnetic coils making use of polyamide wire electrical insulation is limited to less than 240° C. short term, and less than 150° C. long term. This consequently imposes limits on the applied current and/or electrical potential to the electromagnetic coils, as well as the ambient conditions surrounding the motor. This, in turn, limits the achievable power density, and potential operating environments, of the motor (or other electromagnetic devices). Additionally, the heat that is generated in, and transferred away from, the electromagnetic coils, can increase the temperatures of various other components to undesirable levels.

Improving the thermal and environmental capability of electromagnetic devices, such as electric motors, has the potential to dramatically reduce overall size/weight and improve overall efficiency while further improving the power density. The efficiency improvements can be realized by reducing the additional power draw and/or system complexity and/or weight typically required for cooling system components to keep an organically insulated electromagnetic coil/device cool. The ability to operate the electromagnetic device with increased power input and/or at higher temperature would also increase power density.

Hence, there is a need for a method of improving the thermal and environmental capabilities of stator assemblies in electromagnetic devices. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method of assembling a high-temperature electromagnetic machine includes providing a stator structure having at least a plurality of spaced-apart stator teeth, where each of the spaced-apart stator teeth extends radially therefrom toward a rotor opening. A plurality of fully processed electromagnetic coils are provided each is disposed around a different one of the stator teeth. Each of the fully processed electromagnetic coils is produced using a process that comprises: pre-coating magnet wire with a high-temperature insulation precursor to produce pre-coated magnet wire; winding, while applying in-situ a glass-ceramic slurry, the pre-coated magnet wire into a predetermined coil shape to produce a wet-wound green coil; thermally processing the wet-wound green coil to produce an intermediately processed coil; applying a second layer of a high-temperature insulation to the intermediately processed coil to produce a further insulated intermediately processed coil; and thermally processing the further insulated intermediately processed coil to produce the fully processed electromagnetic coil.

In another embodiment, a method of making an electromagnetic coil for use in a high-temperature electromagnetic machine includes pre-coating magnet wire with a high-temperature insulation precursor to produce pre-coated magnet wire; winding, while applying in-situ a glass-ceramic slurry, the pre-coated magnet wire into a predetermined coil shape to produce a wet-wound green coil; and thermally processing the wet-wound green coil to produce a processed coil.

In yet another embodiment, a method of assembling a high-temperature electromagnetic machine includes providing a stator structure having at least a plurality of spaced-apart stator teeth, where each of the spaced-apart stator teeth extending radially therefrom toward a rotor opening. A plurality of processed electromagnetic coils are provided and disposed, one each around a different one of the stator teeth. Each of the processed electromagnetic coils is produced using a process that comprises: pre-coating magnet wire with a high-temperature insulation precursor to produce pre-coated magnet wire; winding, while applying in-situ a glass-ceramic slurry, the pre-coated magnet wire into a predetermined coil shape to produce a wet-wound green coil; and thermally processing the wet-wound green coil to produce a processed coil.

Furthermore, other desirable features and characteristics of the electromagnetic coil manufacturing method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Moreover, as used herein, the phrase "heat flow property(ies)" encompasses both thermal conductivity and thermal diffusivity. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
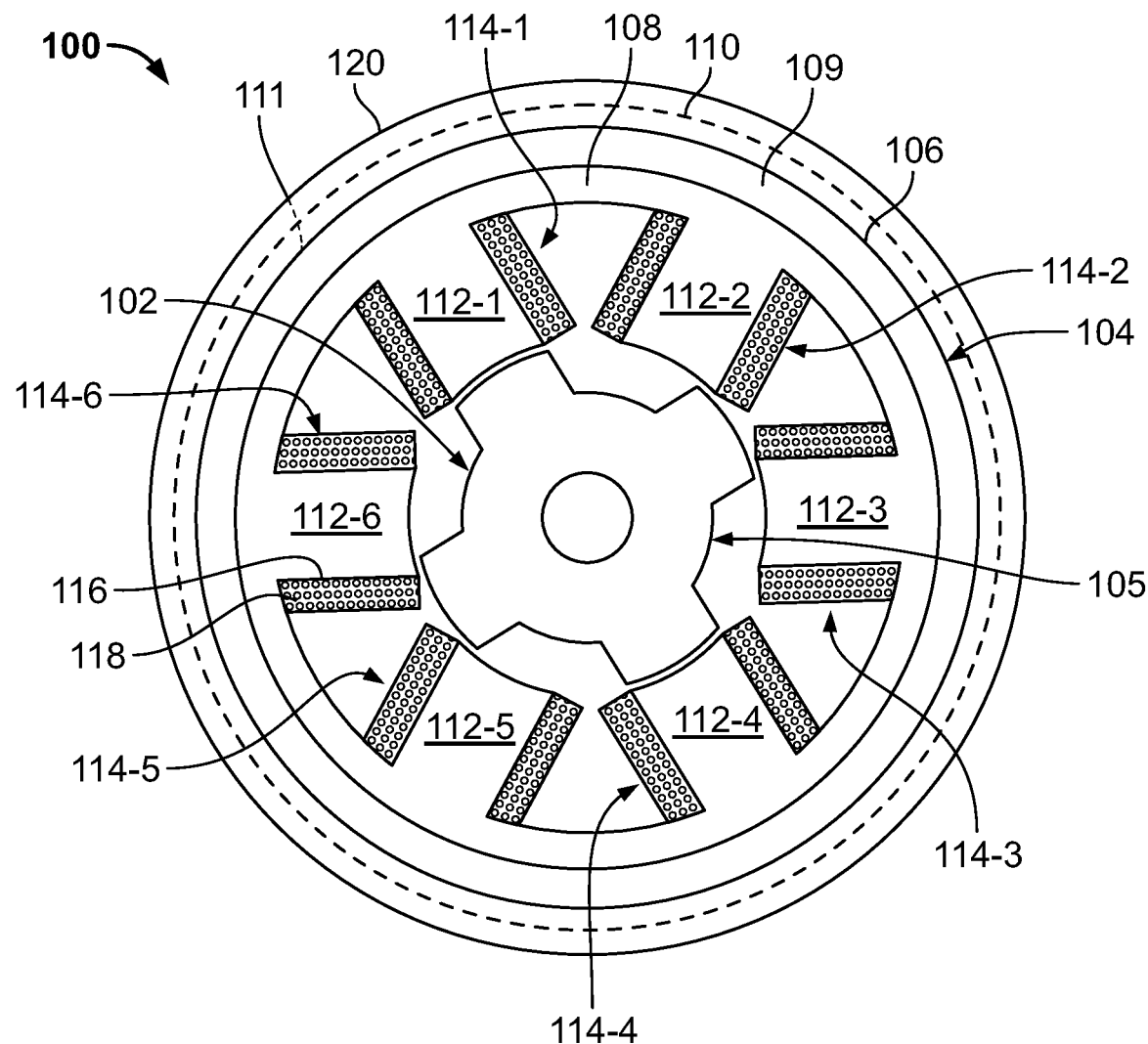
FIG. 1 depicts a simplified schematic cross-sectional view of one embodiment of an electromagnetic machine.

Referring first to FIG. 1, a simplified schematic cross-sectional view of one embodiment of an electromagnetic machine 100 is depicted. The electromagnetic machine 100 includes a rotor 102 and a stator 104. The rotor 102 is mounted for rotation within a rotor opening 105 and is configured, upon receiving a drive torque, to rotate relative to the stator 104. The stator 104 at least partially surrounds the rotor 102 and, at least in the depicted embodiment, includes a stator housing 106, a stator structure 108, which includes a plurality of spaced-apart stator teeth 112 (112-1, 112-2, 112-3, . . . 112-6), and a plurality of electromagnetic coils 114 (114-1, 114-2, 114-2, . . . 114-6). Before proceeding further, it is noted that although the depicted electromagnetic machine 100 is configured as a switched reluctance motor, it will be appreciated that the techniques described herein apply to numerous other types of electromagnetic machines and motor configurations. It is further noted that in other embodiments, electromagnetic machine 100 may not include a separate stator housing. Instead, the stator back-iron may function as the housing.

Returning to the description, it is seen that the stator structure 108 is disposed within the stator housing 106 via, for example, a shrink fit or a press fit, and has a plurality of end bells coupled thereto. Specifically, a first end bell 110 is coupled to a first end 109 of the stator housing 106 and a second end bell 120 is coupled to a second end 111 (not visible in FIG. 1) of the stator housing 106. For clarity and ease of depiction, the first end bell 110 is depicted as being transparent using dotted lines. In the depicted embodiment, the stator structure 108 surrounds the rotor 102, and each of the stator teeth 112 extends radially inwardly from the stator structure 108 toward the rotor 102. It will be appreciated, however, that in other embodiments each of the stator teeth 112 may be joined to a ring at the inner diameter of the stator structure 108 and extend radially outwardly.

Figure 2:
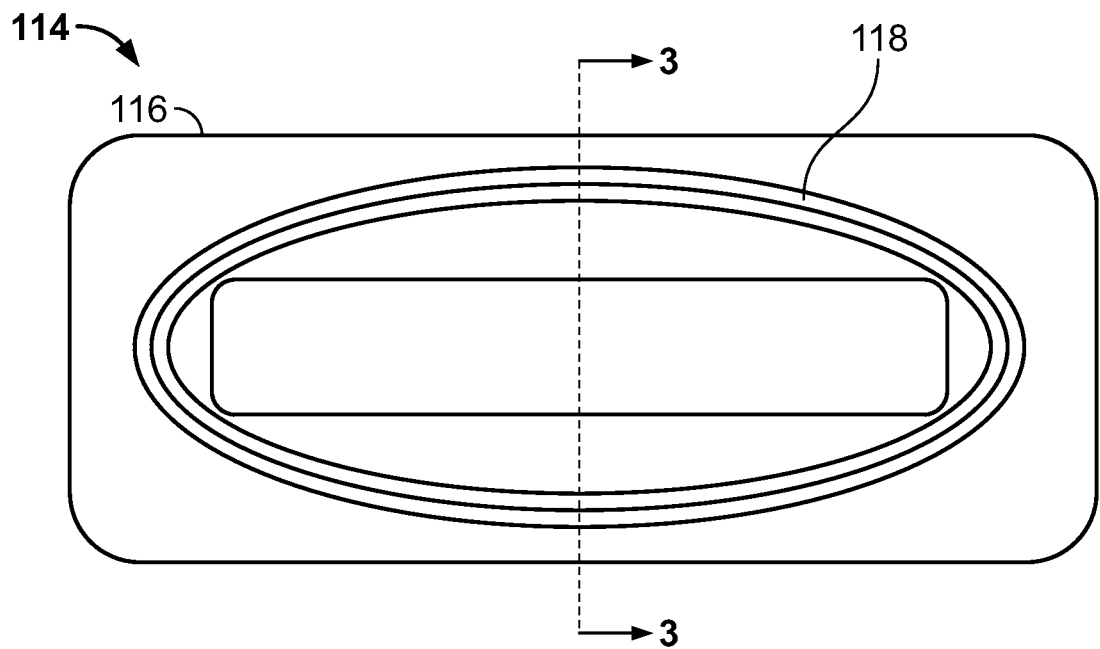
FIG. 2 is a simplified cross-sectional views of an electromagnetic coil encased in a coil cartridge.
Figure 3:
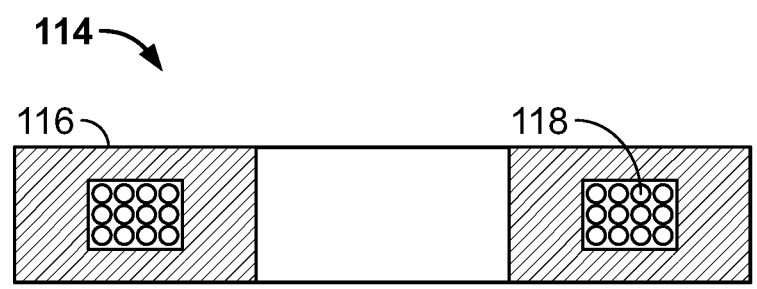
FIG. 3 depicts a cross-sectional view of the encased electromagnetic coil cartridge taken along line 5-5 in FIG. 2.

Each of the electromagnetic coils 114 is disposed around a different one of the stator teeth 112 and, at least in the depicted embodiment, is encased in a coil cartridge 116. For completeness, simplified cross-sectional views of an electromagnetic coil 114 encased in a coil cartridge 116 depicted in FIGS. 2 and 3. It should be noted that although the electromagnetic coil 114 depicted in FIG. 2 has a generally symmetric, elliptical shape, this shape is only exemplary of one embodiment. In other embodiments, the electromagnetic coil 114 may be formed into various shapes, both symmetric and non-symmetric, as needed or desired. It will be additionally appreciated that although the magnet wires 118 that comprise each electromagnetic coil 114 have a circular cross section, these wires 118 could have elliptical cross-sectional shapes, square cross-sectional shapes, rectangular cross-sectional shapes, or various other rhombus cross-sectional shapes, just to name a few.

Whether or not the electromagnetic coils 114 are encased in a coil cartridge 116, each electromagnetic coil 114 has undergone a unique process to become, what is referred to herein, a fully processed coil 114, before being encased and/or before being disposed around one of the stator teeth 112. The process whereby the electromagnetic coils 114 become fully processed coils 114, will now be described.

Figure 4:
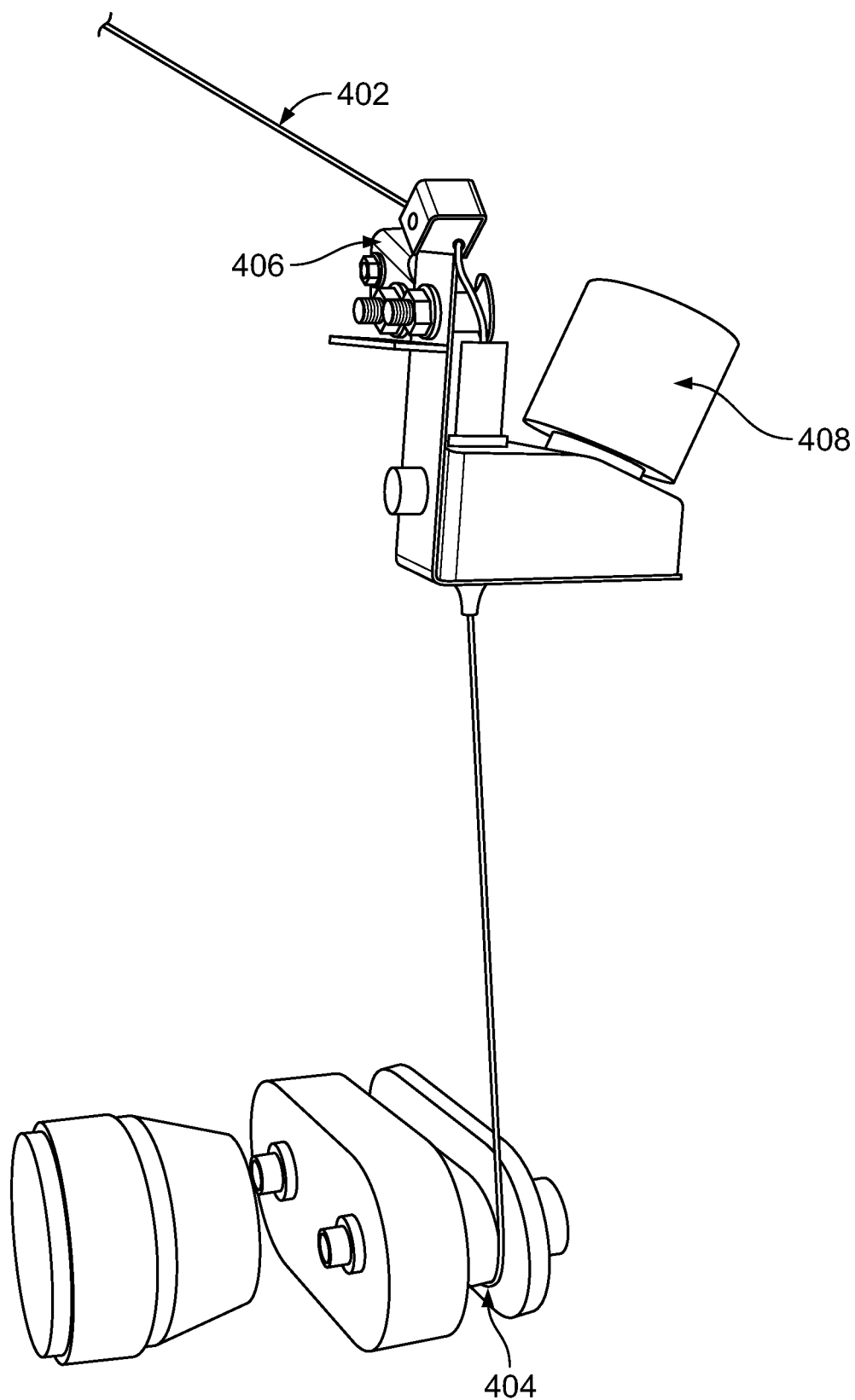
FIG. 4 depicts one example embodiment of a pre-coated magnet wire being wound into a predetermined coil shape while applying, in-situ, a glass-ceramic slurry.

Initially, the magnet wire 118 that comprises an electromagnetic coil 114 is pre-coated with a high-temperature insulation precursor to produce, what is referred to herein, a pre-coated magnet wire 402 (see FIG. 4). The high-temperature insulation precursor may be applied to the magnet wire 118 using any one of numerous techniques. For example, it may be applied via air spraying, dipping, brushing, or painting, just to name a few non-limiting examples.

No matter how it is specifically applied, it will be appreciated that the high-temperature insulation precursor may comprise numerous suitable materials, but preferably comprises a first organic vehicle having mixed therein a glass-ceramic powder mixture. The first organic vehicle acts as a carrier for the glass-ceramic powder mixture that, after application, quickly dries and leaves a polymeric film loaded with the glass-ceramic powder mixture. Although the composition of the first organic vehicle may vary, it preferably comprises a polymer with solvents, surfactants, and one or more suitable chemicals. Some non-limiting examples of a suitable first organic vehicle include 2,2,4-trimethyl-1,3-pentanediol monoisobutyrate and Poly(iso-butyl Methacrylate). It will additionally be appreciated that the glass-ceramic powder mixture may vary. Some non-limiting examples of suitable glass-ceramic powder mixtures include a mixture of $Bi_2O_3$, $B_2O_3$, and $SiO_2$, a mixture of $B_2O_3$ and $Bi_2O_3$, a mixture of ZnO, $B_2O_3$, and BaO, a mixture of $TiO_2$, $SiO_2$, and $R_2O$, a mixture of $Li_2O$, BaO, and $SiO_2$, and a mixture of $Bi_2O_3$, $B_2O_3$, and ZnO.

Next, and with continued reference to FIG. 4, the pre-coated magnet wire 402 is wound into a predetermined coil shape while applying, in-situ, a glass-ceramic slurry, thereby producing, what is referred to herein, a wet-wound green coil 404. The glass-ceramic slurry may be applied to the pre-coated magnet wire 402 using any one of numerous techniques. In the depicted embodiment, it is applied by running the pre-coated magnet wire 402, via a wire guide 406, through a dispenser 408 having the glass-ceramic slurry disposed therein, and is done so prior to entering the coil winding portion. However, as with the high-temperature insulation precursor, the glass-ceramic slurry may also be applied via air spraying, dipping, brushing, or painting, just to name a few non-limiting examples. It should also be appreciated that the wet glass-ceramic slurry can alternatively be disposed onto the coil after winding is completed, thus creating coil 404.

It will be appreciated that the glass-ceramic slurry may also comprise numerous suitable materials, but preferably comprises a second organic vehicle having mixed therein a glass-ceramic powder mixture. The second organic vehicle acts as a carrier for the glass-ceramic powder mixture and is different from the first organic vehicle in that it remains in liquid form after application. Although the composition of the second organic vehicle may, or may not, vary from the material pre-deposited on the magnet wire 402, it too preferably comprises a polymer with solvents, surfactants, and one or more suitable chemicals. Some non-limiting examples of a suitable second organic vehicle include ethyl cellulose, dimethyl silicone oil, dibutyl phthalate, polyethylene glycol. It will additionally be appreciated that the glass-ceramic powder mixture may vary, and may, at least in some embodiments, be the same glass-ceramic powder mixture used for the high-temperature insulation precursor. Some non-limiting examples of suitable glass-ceramic powder mixtures include a mixture of $Bi_2O_3$, $B_2O_3$, and $SiO_2$, a mixture of $B_2O_3$ and $Bi_2O_3$, a mixture of $ZnO$, $B_2O_3$, and $BaO$, a mixture of $TiO_2$, $SiO_2$, and $R_2O$, a mixture of $Li_2O$, $BaO$, and $SiO_2$, and a mixture of $Bi_2O_3$, $B_2O_3$, and $ZnO$.

Figure 5:
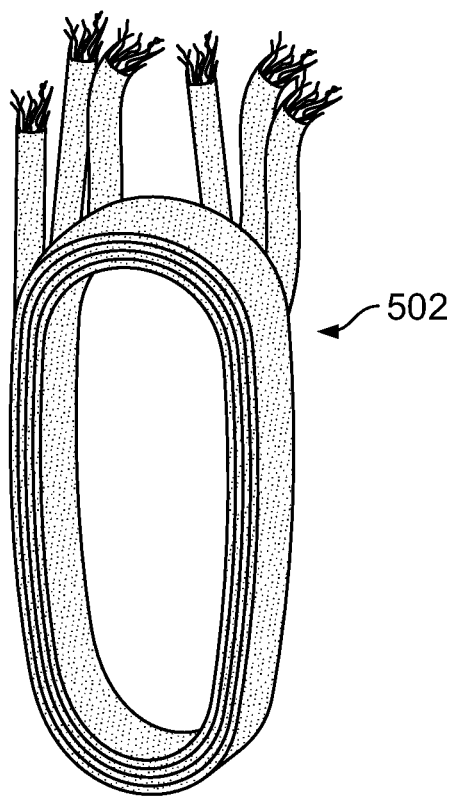
FIG. 5 depicts one embodiment of an intermediately processed coil.

After producing the wet-wound green coil 404, the wet-wound green coil 404 is then thermally processed to produce an intermediately processed coil 502, an example embodiment of which is depicted in FIG. 5. The thermal processing that the wet-wound green coil 404 undergoes may vary. In one embodiment, the wet-wound green coil 404 may initially undergo a pre-drying process in, for example, an oven, box furnace, vacuum furnace, belt furnace, and any of numerous suitable heating techniques. The pre-drying process, when implemented, occurs at a first predetermined temperature for a first predetermined time period, to remove solvents and produce a dried green coil. The dried green coil is then thermally processed in an oven, box furnace, vacuum furnace, belt furnace, or any of numerous suitable heating techniques at a second predetermined temperature for a second predetermined time period to remove organics to produce a burned out, or brown, coil. The brown coil is further thermally processed, in an oven, box furnace, vacuum furnace, belt furnace, and any of numerous suitable heating techniques, at a third predetermined temperature for a third predetermined time period to produce the intermediately processed coil.

It will be appreciated that the first predetermined temperature and the first predetermined time may vary depending, for example, on the compositions of the first and second organic vehicles. For example, when the organic vehicles include alcohol solvents, the first predetermined temperature is a temperature that is less than 150° C. and the first predetermined time period may be between 5 and 30 minutes. When the organic vehicles include water soluble solvents, the first predetermined temperature is a temperature that is less than 100° C. and the first predetermined time period may be between 10 and 60 minutes. It will additionally be appreciated that the second predetermined temperature and the second predetermined time may vary. In one particular embodiment, the second predetermined temperature is a temperature less than 250° C. and the second predetermined time period is between 5 and 30 minutes.

The third predetermined temperature and third predetermined time period that are used to produce the intermediately processed coil may also vary depending, for example, which of the above-mentioned glass-ceramic powder mixtures that was used. For example, if the $Bi_2O_3$, $B_2O_3$, and $SiO_2$ mixture is used, the third predetermined temperature is between 500° C. and 600° C. and the third predetermined time is between 15 and 30 minutes. If the $B_2O_3$ and $Bi_2O_3$ mixture is used, the third predetermined temperature is between 400° C. and 550° C. and the third predetermined time is between 10 and 30 minutes. If the $ZnO$, $B_2O_3$, and $BaO$ mixture is used, the third predetermined temperature is between 550° C. and 650° C. and the third predetermined time is between 10 and 30 minutes. If the $TiO_2$, $SiO_2$, and $R_{20}$ mixture is used, the third predetermined temperature is between 750° C. and 850° C. and the third predetermined time is between 10 and 30 minutes. If the $Li_2O$, $BaO$, and $SiO_2$ mixture is used, the third predetermined temperature is between 550° C. and 650° C. and the third predetermined time is between 10 and 30 minutes. And if the $Bi_2O_3$, $B_2O_3$, and $ZnO$ mixture is used, the third predetermined temperature is between 500° C. and 650° C. and the third predetermined time is between 10 and 30 minutes.

Figure 6:
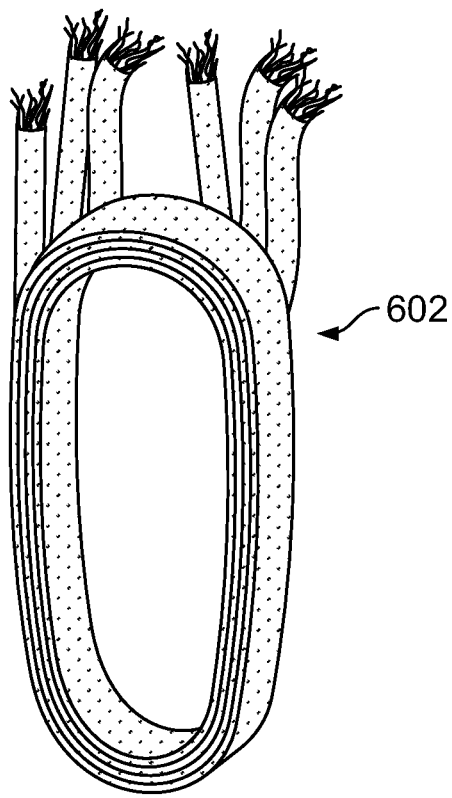
FIG. 6 depicts one embodiment of a further insulated intermediately processed coil.

In some embodiments, after thermally processing the wet-wound green coil 404 to create intermediately processed coil 502, a second layer of the high-temperature insulation precursor is applied to the intermediately processed coil 502 to produce a further insulated intermediately processed coil 602 (see FIG. 6). When this is done, the high-temperature insulation precursor, which may be the same as or different from the high-temperature insulation precursor applied to the magnet wire 402 may be applied using any one of the above-mentioned techniques. Namely, via air spraying, dipping, brushing, or painting, just to name a few non-limiting examples.

After applying the second layer of high-temperature insulation precursor, the further insulated intermediately processed coil 602 is subjected to thermal processing, to thereby produce a fully processed electromagnetic coil 114. As may be appreciated, whether the high-temperature insulation precursor that is applied to intermediately processed coil 502 is the same as or different from the high-temperature insulation applied to the magnet wire 402, the high-temperature insulation precursor will be one of the suitable high-temperature precursors previously listed. As such, the thermal processing will be similar to the thermal processing described above, depending on the composition of the high-temperature insulation precursor. Thus, the further insulated intermediately processed coil 602 is also fired, in an oven, box furnace, vacuum furnace, belt furnace, and any one of numerous suitable heating system, at the third predetermined temperature for the third predetermined time period. The application and firing of the second layer of the high-temperature insulation precursor improves the dielectric properties of the fully processed coil 114, and also improves coil-to-coil and coil-to-stator voltage breakdown.

Before proceeding further, it should be noted that if the above-described steps of applying the second layer of the high-temperature insulation precursor and the subsequent thermal processing are not done, then for those embodiments, the intermediately processed coil 502 is the fully processed electromagnetic coil 114.

Figure 7:
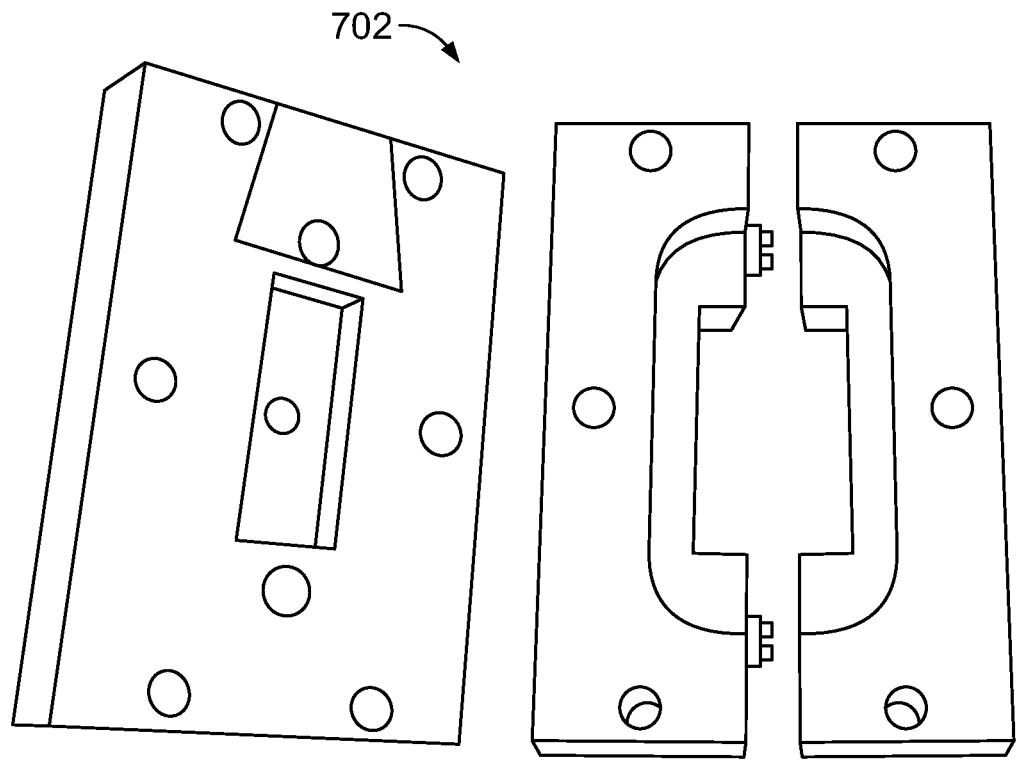
FIG. 7 depicts one example embodiment of a mold that may be used to make an encapsulated electromagnetic coil.
Figure 8:
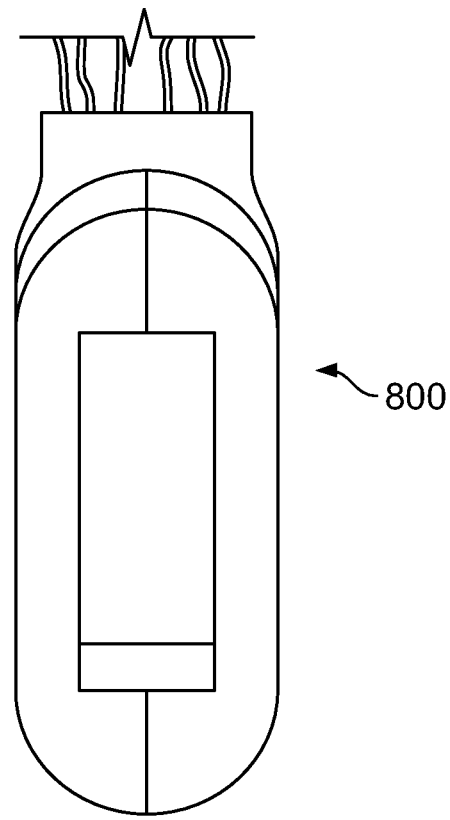
FIG. 8 depicts one embodiment of an encased electromagnetic coil made using the example mold of FIG. 7.

Returning now to the description, and as was previously noted, each fully processed electromagnetic coil 114 may also be encased in a coil cartridge 116. To do so, the coil 114 and a suitable high-temperature insulation molding material are disposed within a mold 702, such as the one depicted in FIG. 7, and processed. Some examples of suitable high-temperature insulation molding materials include various geopolymers such as, for example, various sodium-silicates, various alumino-silicates, and various magnesia-silicates. The processing typically entails allowing the high-temperature geopolymer to dry/cure. After this, the encapsulated coil 800 (see FIG. 8) may be disposed on the tooth of the electromagnetic device 100.

Figure 9:
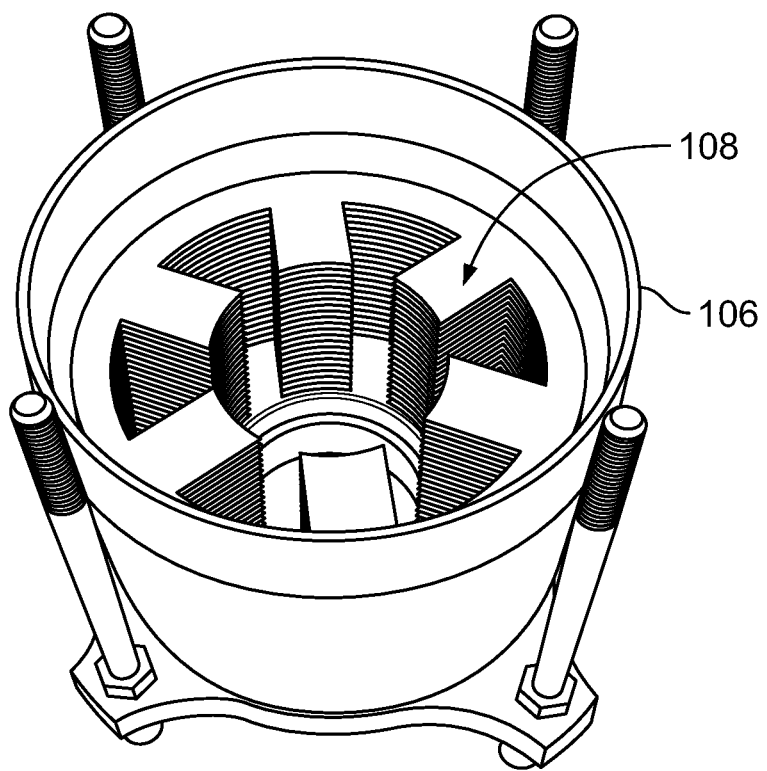
FIG. 9 depicts one embodiment of a stator structure disposed within a stator housing.
Figure 10:
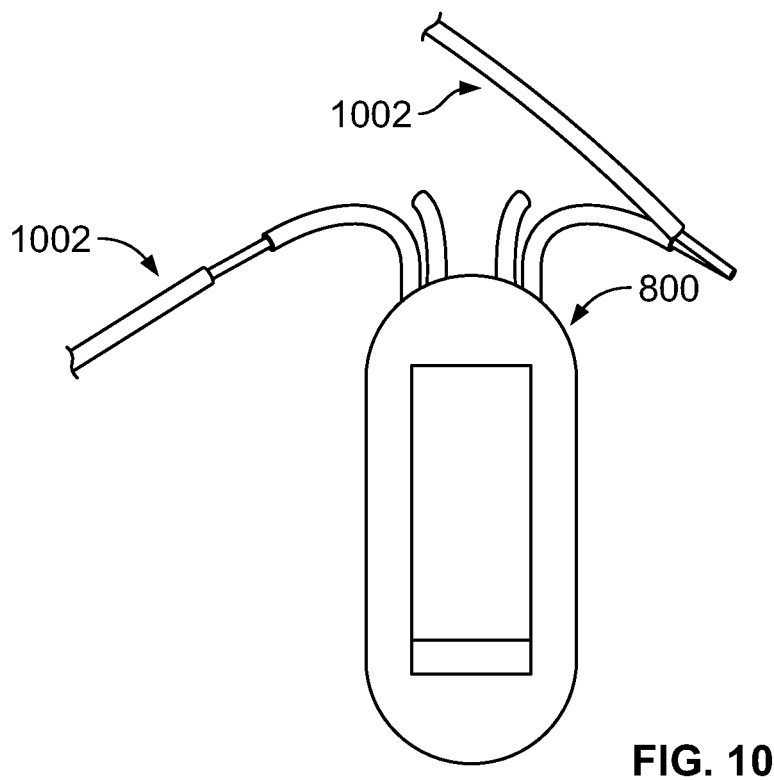
FIG. 10 depicts one embodiment of a fully processed electromagnetic coil electrically connected to associated lead wires.
Figure 11:
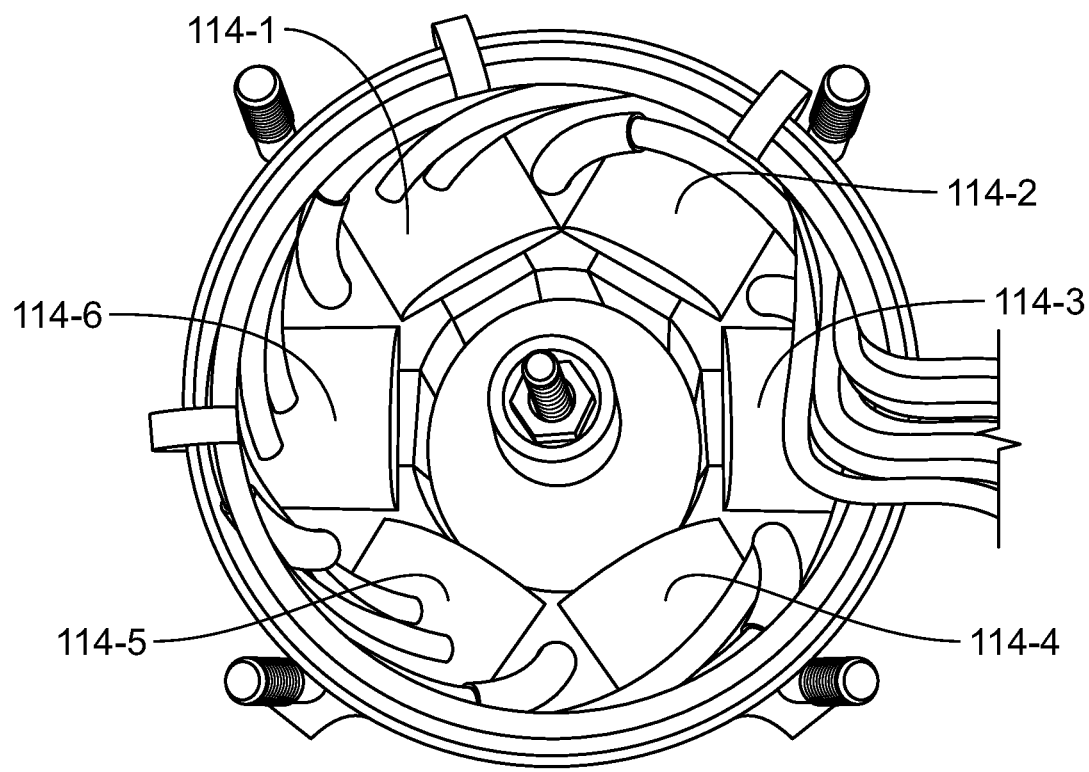
FIG. 11 depicts fully processed coils disposed around different ones of the stator teeth depicted in FIG. 9.

After all of the fully processed coils 114 (114-1, 114-2, 114-2, . . . 114-6) have been made (or as each is made), the electromagnetic machine 100 may be assembled. This may be done by, for example, disposing the stator structure 108 within the stator housing 106 via, for example, a shrink fit or a press fit process (see FIG. 9). If desired, each of the coiled wire ends of the fully processed electromagnetic coils 114 may then be electrically joined to associated lead wires 1002 (see FIG. 10) and then disposed around a different one of the stator teeth 112 (see FIG. 11). In the embodiment depicted in FIG. 11, the fully processed electromagnetic coils 114 are encased. It will be appreciated, however, that in other embodiments the fully processed electromagnetic coils 114 may not be encased.

Figure 12:
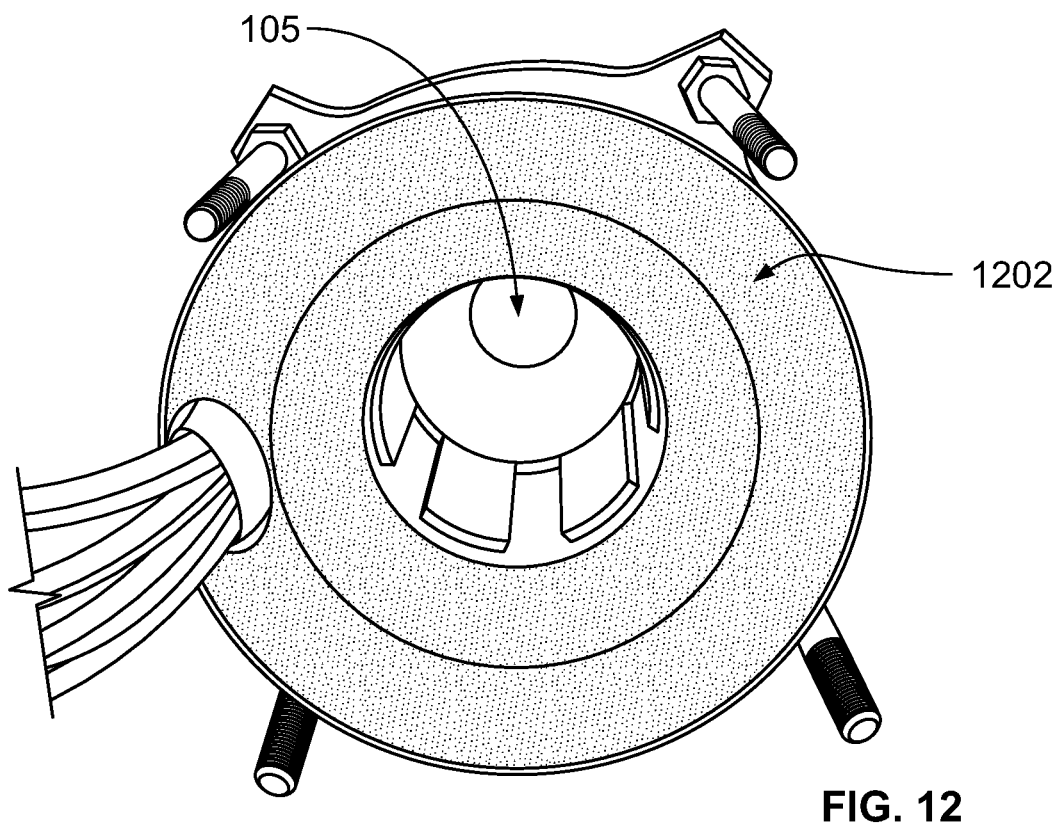
FIG. 12 depicts assembly of FIG. 11 after a high temperature geopolymer potting material has been injected into the stator housing.

Regardless of whether or not the fully processed electromagnetic coils 114 are encased, once the coils are in place a high temperature geopolymer potting material is then injected into the stator housing 106 and is processed. This may be done before or after the first and second end bells 110, 120 are coupled to the first and second ends 109, 111 of the stator housing 106. Regardless, and as depicted in FIG. 12, the high temperature geopolymer potting material 1202 is injected into the stator housing 106 in a manner that any air gaps between adjacent coils 114, between adjacent stator teeth 112, and between the stator structure 108 and the stator housing 106 are filled with the potting material 1202, and the rotor opening 105 remains void of the potting material 1202.

Some examples of suitable high-temperature geopolymer potting materials include, for example, various sodium-silicates, various alumino-silicates, and various magnesia-silicates. The assembly may then undergo additional/final thermal processing to allow the high-temperature geopolymer potting material to dry/cure. This processing may entail, for example, placing the assembly in an oven/furnace and raising the temperature directly to the desired temperature—typically just above the expected maximum operating temperature of the device. For example, if the desired operating temperature of the device is 750° F., the oven/furnace temperature may be set to 800° F., and allowed to soak overnight.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of assembling a high-temperature electromagnetic machine, the method comprising the steps of:
   providing a stator structure having at least a plurality of spaced-apart stator teeth, each of the spaced-apart stator teeth extending radially therefrom toward a rotor opening;
   providing a plurality of fully processed electromagnetic coils; and
   disposing each of the fully processed electromagnetic coils around a different one of the stator teeth,
   wherein each of the fully processed electromagnetic coils is produced using a process that comprises:
      pre-coating magnet wire with a high-temperature insulation precursor to produce pre-coated magnet wire;
      winding, while applying in-situ a glass-ceramic slurry, the pre-coated magnet wire into a predetermined coil shape to produce a wet-wound green coil;
      thermally processing the wet-wound green coil to produce an intermediately processed coil;
      applying a second layer of a high-temperature insulation to the intermediately processed coil to produce a further insulated intermediately processed coil; and
      thermally processing the further insulated intermediately processed coil to produce the fully processed electromagnetic coil.

2. The method of claim 1, wherein:
   the process further comprises encasing each of the fully processed electromagnetic coils in high temperature insulation molding material to thereby produce a plurality of encased electromagnetic coils; and
   the method comprises disposing each of the encased electromagnetic coils around a different one of the stator teeth, instead of disposing each of the fully processed electromagnetic coils around a different one of the stator teeth.

3. The method of claim 1, further comprising:
   disposing the stator structure into a housing, the housing having a first end and a second end;
   coupling a first end bell to the first end and a second end bell to the second end; and
   injecting high temperature geopolymer potting material into the housing in a manner that:
      any air gaps between adjacent coils, between adjacent stator teeth, and between the stator structure and housing are filled with the potting material, and
      the rotor opening remains void of the potting material.

4. The method of claim 3, the high temperature geopolymer potting material is selected from the group consisting of geopolymer potting materials that comprise:
   sodium-silicates;
   alumino-silicates; and
   magnesia-silicates.

5. The method of claim 1, wherein:
the high-temperature insulation precursor comprises a first organic vehicle having mixed therein a glass-ceramic powder mixture; and
the glass-ceramic powder mixture is selected from the group consisting of:
$Bi_2O_3$, $B_2O_3$, and $SiO_2$;
$B_2O_3$ and $Bi_2O_3$;
ZnO, $B_2O_3$, and BaO;
$TiO_2$, $SiO_2$, and $R_2O$;
$Li_2O$, BaO, and $SiO_2$; and
$Bi_2O_3$, $B_2O_3$, and ZnO.

6. The method of claim 5, wherein:
the glass-ceramic slurry comprises a second organic vehicle having mixed therein the glass-ceramic powder mixture; and
the second organic vehicle is different from the first organic vehicle.

7. The method of claim 1, wherein the step of thermally processing the wet-green-wound coil to produce an intermediately processed coil comprises:
pre-drying the wet-green-wound coil at a first predetermined temperature for a first predetermined time period to produce a dried green-wound coil;
burning out the dried-green-wound coil at a second predetermined temperature for a second predetermined time period to produce a brown green-wound coil; and
firing the brown green-wound coil at a third predetermined temperature for a third predetermined time period to produce the intermediately processed coil.

8. The method of claim 7, wherein the step of thermally processing the further insulated intermediately processed coil comprises:
firing the intermediately processed coil at the third predetermined temperature for the third predetermined time period to produce the fully processed electromagnetic coil.

* * * * *